US012360936B2

(12) United States Patent
Li

(10) Patent No.: US 12,360,936 B2
(45) Date of Patent: Jul. 15, 2025

(54) INTERCONNECT BUS SAFETY

(71) Applicant: Infineon Technologies AG, Neubiberg (DE)

(72) Inventor: Lin Li, Munich (DE)

(73) Assignee: Infineon Technologies AG, Neubiberg (DE)

( * ) Notice: Subject to any disclaimer, the term of this patent is extended or adjusted under 35 U.S.C. 154(b) by 182 days.

(21) Appl. No.: 18/178,803

(22) Filed: Mar. 6, 2023

(65) Prior Publication Data

US 2023/0289313 A1    Sep. 14, 2023

(30) Foreign Application Priority Data

Mar. 10, 2022  (EP) ..................................... 22020100

(51) Int. Cl.
*G06F 13/40*        (2006.01)
(52) U.S. Cl.
CPC ...... *G06F 13/4068* (2013.01); *G06F 2213/40* (2013.01)
(58) Field of Classification Search
CPC .............. G06F 13/4068; G06F 2213/40
USPC ....................................................... 710/305
See application file for complete search history.

(56) References Cited

U.S. PATENT DOCUMENTS

| 2007/0022219 A1* | 1/2007 | Yasui .................. G06F 13/387 709/213 |
| 2011/0004816 A1* | 1/2011 | Wood .................. H04L 69/324 714/799 |
| 2014/0372840 A1* | 12/2014 | Barthel .................. H04L 1/0061 714/807 |
| 2017/0139388 A1* | 5/2017 | Sachs ........................ H04L 1/00 |
| 2020/0081765 A1 | 3/2020 | Rosenblattl |
| 2021/0385010 A1 | 12/2021 | Miyazaki |
| 2023/0008730 A1* | 1/2023 | Ulman .................... H04L 1/203 |

OTHER PUBLICATIONS

Shreejith Shanker: "Enhancing Automotive Embedded Systems with FPGAs", Jan. 1, 2016. Retrieved from Internet: URL:http://warwick.ac.uk/fac/sci/eng/staff/saf/publications/shreejith-pdhthesis2016.pdf.
International Search Report dated Jul. 27, 2022 in connection with EP 22020100.8.

* cited by examiner

*Primary Examiner* — Christopher B Shin
(74) *Attorney, Agent, or Firm* — Eschweiler & Potashnik, LLC

(57) ABSTRACT

An interconnect connects a first device running a first application and with a first interface and a second device running a second application and with a second interface. The first device has a safety guard which may be used in an operations mode to send safety relevant data from the first application to the second application. Safety information is added to the safety relevant data to create safety marked data. The safety marked data is transmitted to the second application. The safety marked data is also looped back through interconnect to the safety guard which checks the loop back data using the safety information in the loop back data, and when the checking indicates an error, transmits an error notification signal to the first application and/or the second application.

15 Claims, 2 Drawing Sheets

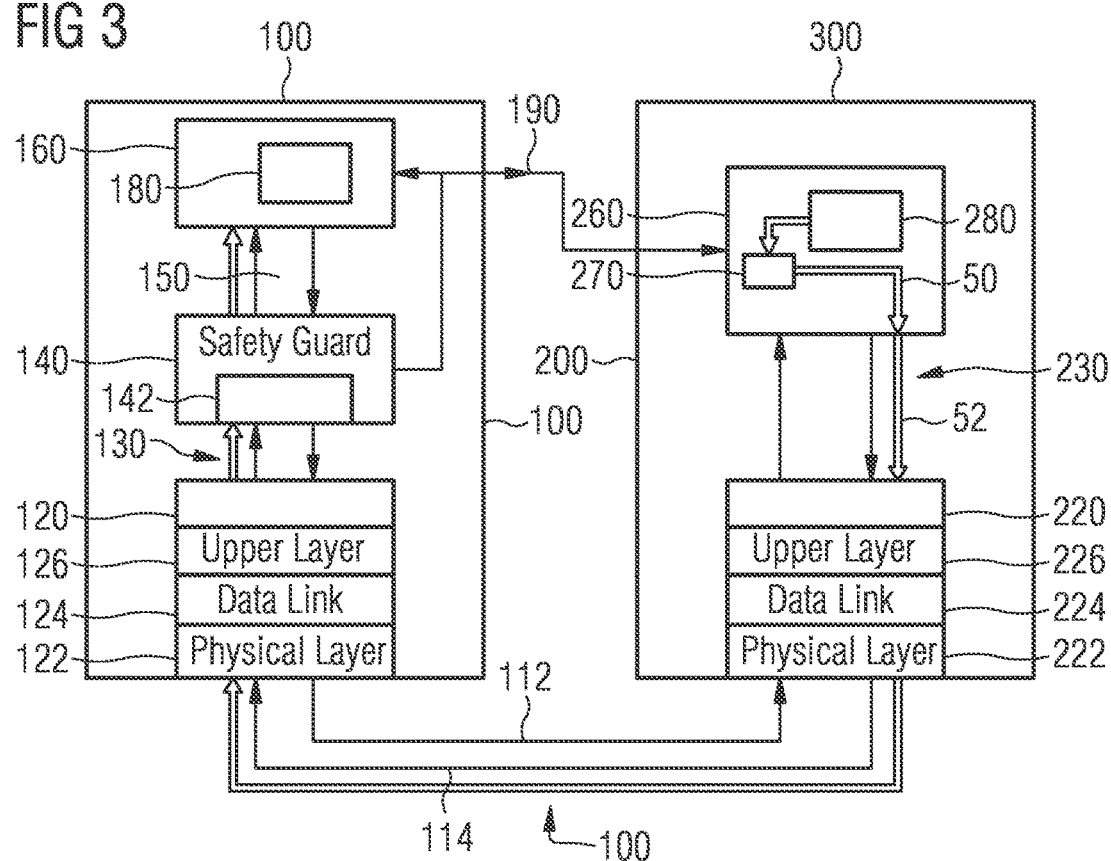
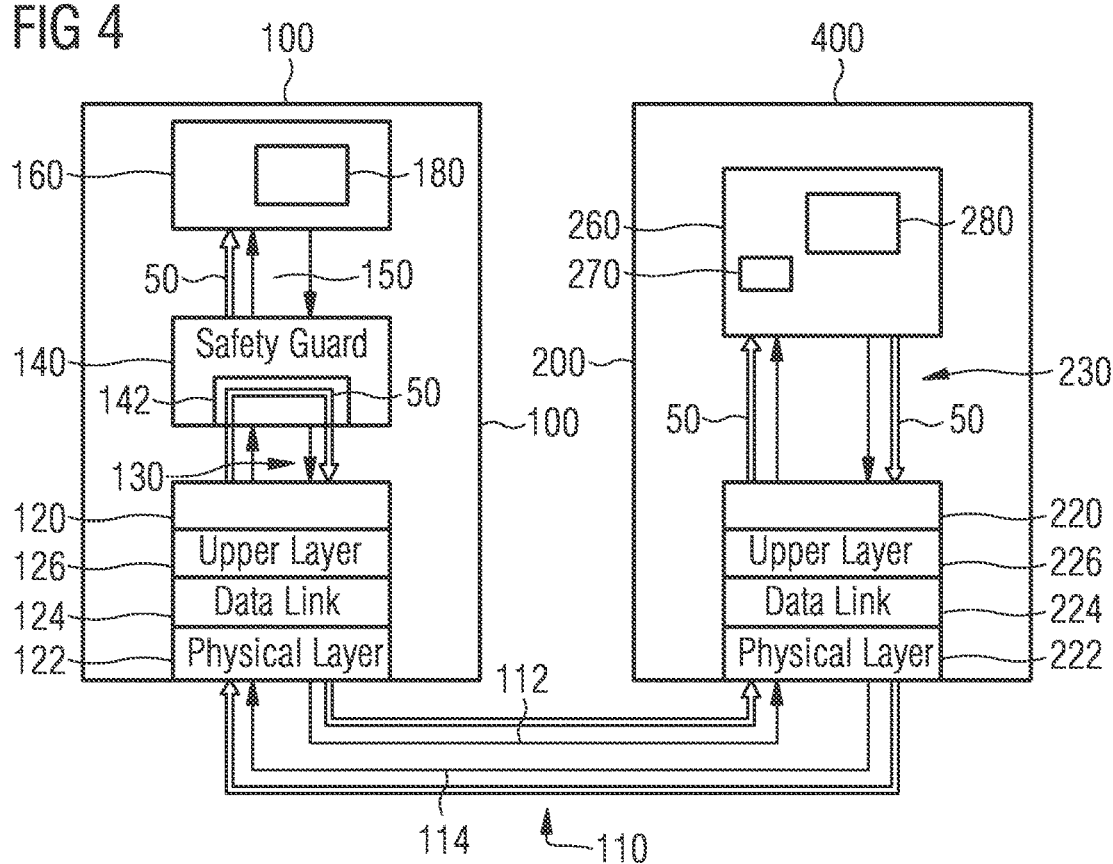

INTERCONNECT BUS SAFETY

REFERENCE TO RELATED APPLICATIONS

This application claims priority to European Patent Application 22020100.8, filed on Mar. 10, 2022. The contents of the above-referenced Patent Application is hereby incorporated by reference in its entirety.

FIELD OF THE INVENTION

The invention relates to a system including first and second devices connected by an interconnect bus, and in particular to such a system addressing safety concerns.

BACKGROUND

A number of interconnect buses have been proposed for various applications. One such interconnect bus is the Peripheral Component Interconnect Express, PCIe, bus which represents a full duplex serial interface widely applied in computers, including servers, and mobile devices.

Systems using such an interconnect bus are increasingly in use in vehicles, for example in automotive applications, and many applications in vehicles require functional safety, i.e. to transmit data in such a way that errors occurring during data transmission are detected and dealt with appropriately. In this way, errors will not lead to dangerous conditions when driving the vehicles concerned. For example, there may be a need to deliver a system using a particular Automotive Safety Integrity Level, ASIL, such as ASIL-B or ASIL-D. These ASIL levels are defined in the international standard ISO 26262. Functional safety may also be required in other applications, not just in automotive.

In order to achieve functional safety data may be checked using cyclic redundancy checks, CRC. However, calculating such CRCs using software is slow and inefficient.

There is accordingly a need to address safety in interconnect connected systems

SUMMARY OF INVENTION

According to an aspect, there is provided a system comprising a first device, comprising: a first processor for running a first application; a first interface for transmitting and receiving data along a two-way communication channel, and a safety guard consisting of a hardware block between the processor and the interface; a second device comprising: a second processor for running a second application; a second interface connected to the second processor for transmitting and receiving data along the two-way communication channel with the first interface; wherein the system is arranged to send safety relevant data from the first application to the second application by: in the safety guard, adding safety information to the safety relevant data to create safety marked data; transmitting the safety marked data through the first interface and the two-way communication channel to the second interface; extracting the safety relevant data from the safety marked data and forwarding the extracted safety relevant data to the second application; retransmitting the safety marked data from the second interface back through the two-way communication channel to the first interface as loop back data; in the safety guard, checking the loop back data using the safety information in the loop back data, and if the checking indicates an error, transmitting an error notification signal to the first application and/or the second application.

By providing a safety guard system, functional safety may be enhanced without requiring all interconnected devices to be complex devices with advanced hardware for CRC calculation.

The inventors have realized that in many applications the full duplex bandwidth offered by the interconnect bus may not be used. In many cases, the data streams mostly from one device to another. It is therefore possible to use unused bandwidth, which may be considered spare bandwidth, to enhance safety.

In an alternative system, complex calculations would need to be carried out at both ends of the interface: the CRC must be calculated in the sending device and then checked in the receiving device. Such calculations may be viable in high-end microprocessors but in automotive applications it is very common that either the receiving or the sending device is not capable of such calculations.

In contrast to such an alternative system, embodiments of the invention provide a first device with a safety guard system which can communicate in a safety compliant way with a variety of devices, even devices without sufficient resource to carry out complex calculations.

Examples provide a device which is capable of a number of different modes of operation, including the mode of operation described above, to increase flexibility.

In another aspect of the invention, there is provided a safety device comprising
 a. a first processor for running a first application;
 b. a first interface for transmitting and receiving data along a two-way communication channel to a second device having a second interface and having a second processor for running a second application, and
 c. a safety guard consisting of a hardware block between the processor and the interface;
 d. wherein the safety device is arranged to send safety relevant data from the first application to the second application by:
 e. in the safety guard, adding safety information to the safety relevant data to create safety marked data;
 f. transmitting the safety marked data through the first interface and the two-way communication channel to the second interface;
 g. receiving in the first interface safety marked data as looped back data looped from the second device back through the two-way communication channel to the first interface as loop back data;
 h. in the safety guard, checking the loop back data using the safety header in the loop back data, and if the checking indicates an error, transmitting an error notification signal to the first application and/or the second application.

In another aspect of the invention, there is provided a method of transmitting data between a first device and a second device along a two-way communications interface, wherein the first device has a first processor running a first application, a first interface for transmitting and receiving data and a safety guard between the first processor and the first interface, and the second device has a second processor running a second application, and a second interface for transmitting and receiving data, the method comprising sending safety relevant data from the first application to the second application by:
 i. in the safety guard, adding safety information to the safety relevant data to create safety marked data;
 j. transmitting the safety marked data through the first interface and the two-way communication channel to the second interface;

k. extracting the safety relevant data from the safety marked data and forwarding the extracted safety relevant data to the second application;
l. retransmitting the safety marked data from the second interface back through the two-way communication channel to the first interface as loop back data;
m. in the safety guard, checking the loop back data using the safety header in the loop back data, and if the checking indicates an error, transmitting an error notification signal to the first application and/or the second application.

BRIEF DESCRIPTION OF THE DRAWINGS

Examples will now be described, purely by way of example, with reference to the accompanying drawings, in which:

FIG. 3 is a schematic drawing of a system according to an example, having the same first device as the example of FIG. 1 but a different second device.

FIG. 4 is a schematic drawing of a further system according to an example, having the same first device as the example of FIG. 1 but a different second device.

The accompanying drawings are schematic and not to scale. Like components may be referenced by the same reference number in different figures.

DETAILED DESCRIPTION

Figure 1:
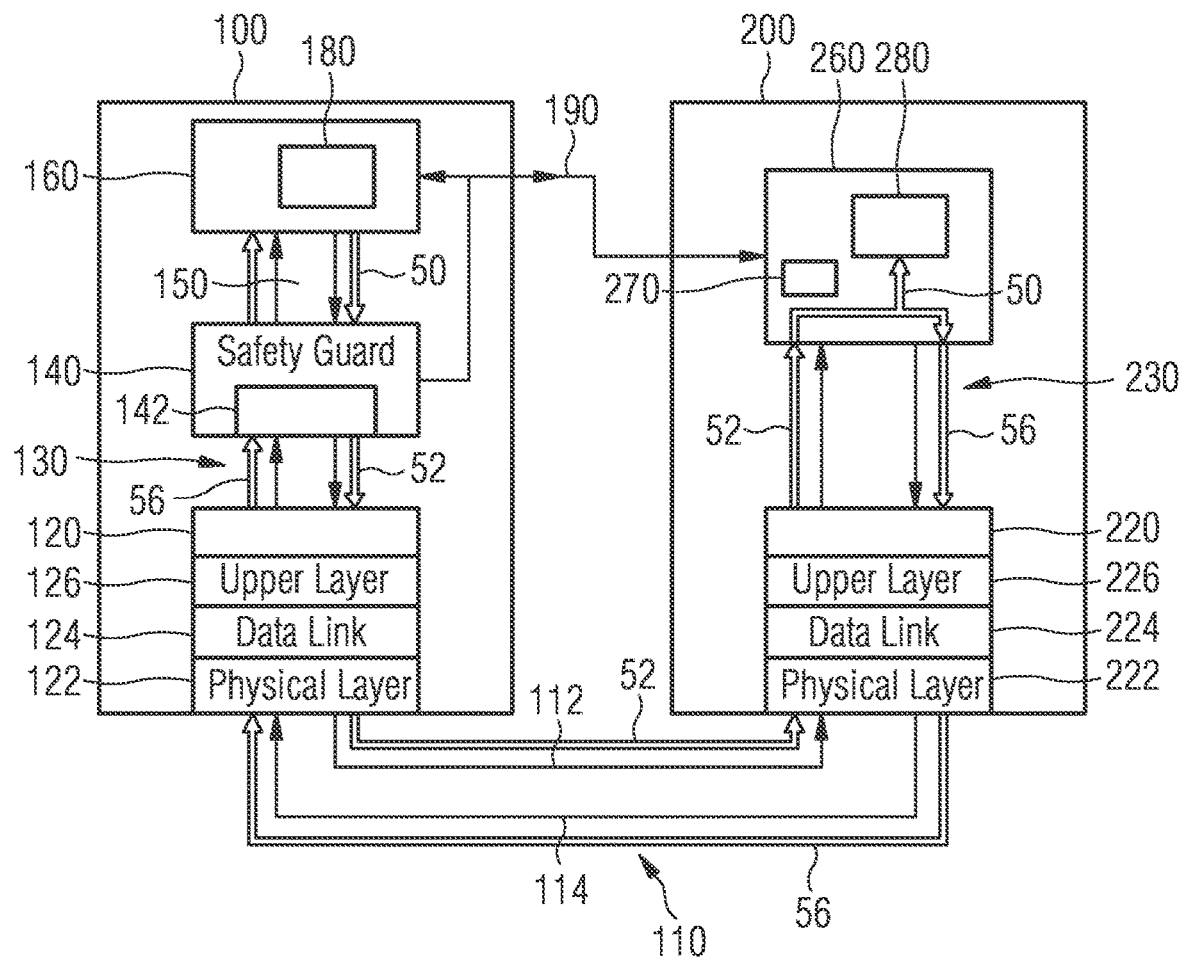
FIG. 1 is a schematic drawing of a system with a first and a second device, according to an example.

As shown in FIG. 1 an interconnected system is shown with a first device 100 and a second device 200 connected together by interface bus 110. The interface bus 110 is a two-way communication channel 110 capable of transmitting in both directions, as illustrated with a first transmission channel 112 from the first device 100 to the second device 200 and a second transmission channel 114 from the second device 200 to the first device 100. In the example the two-way communication channel 110 is a Peripheral Component Interconnect Express, PCIe, bus but alternative and/or multiple buses may be used. In an alternative example case, monodirectional buses in each direction may together make up the two-way communication channel 110.

The first device 100 may be for example a microprocessor, a microcontroller or other chip with the capability of executing programmed instructions. A processor core 160 is provided which is capable of running an application 180. Those skilled in the art will appreciate that the first device 100 will also contain registers, memory access and a large number of components that support the running of the application 180 on the processor core 160 but which are known and will not be described further.

The first device 100 also contains an interface 120 for connection to the two-way communication channel 110 for controlling communication along the bus 110. The interface 120 may be divided into layers, including a physical layer 122 for delivering the physical packets onto the bus 110 and taking the incoming packets, and then passing the packets to a data link layer 124 from which the packets get passed to an upper layer 126, for example a transactional layer, from which the packets get transferred into and out of the interface 120 towards the processor core 160.

In addition to the above components the first device 100 also contains a safety guard 140 which is connected between the interface 120 on the one hand and the processor 160 and the application 180 running on the processor 160 on the other hand. The safety guard 140 is connected to the interface 120 by a first bidirectional interconnect 130 and to the processor 160 by a second bidirectional interconnect 150. Such interconnects 130, 150 may be, for example, a serial peripheral interconnect, SPI.

The safety guard 140 is a separate hardware block to the processor core 160 and to the interface 120.

In this example the second device 200 is a device which does not have a safety guard 140. The second device 200 may be for example a microprocessor, a microcontroller or other chip with the capability of executing programmed instructions, such as a power management integrated circuit, PMIC, system on chip SOC, or other device.

A second processor core 260 is provided which is capable of running an application 280. Those skilled in the art will appreciate that the second device 200 will also contain registers, memory access and a large number of components that support the running of the application 280 on the processor core 260 but which are known and will not be described further.

The second device 200 also contains a second interface 220 for connection to the two-way communication channel 110 for controlling communication along the bus 110. The second interface 220 may be divided into layers, including a physical layer 222 for delivering the physical packets onto the bus 110 and taking the incoming packets, and then passing the packets to a data link layer 224 from which the packets get passed to an upper layer 226, for example a transactional layer, from which the packets get transferred into and out of the second interface 220 to the processor core 260.

The second device 260 does not contain a safety guard 140 and may accordingly be a standard component. The safety relevant data 50 may pass directly between second interface 220 and second processor core 260 along a third bidirectional interconnect 230.

Those skilled in the art will realize that although the first, second and third bidirectional interconnects 130, 150, 230 may be shown as single interconnects, each of the interconnects 130, 150, 230 may in reality be formed of a plurality of interconnects with bridges or links between the interconnects. Some components of the first and second bidirectional interconnects 130, 150 may be shared.

The operation of the system will now be described, purely by way of example.

Consider the case that safety relevant data 50 needs to be transmitted from the first application 180 in the first device 100 to the second application 280 in the second device 200.

The safety relevant data 50 is first transmitted through second bidirectional interface 150 to the safety guard 140, which contains a safety unit 142 which adds safety information 62 to the safety relevant data 50 to create safety marked data 52. How this is done will be described in more detail below.

The safety marked data 52 is then transmitted through first bidirectional interface 130 to interface 120 which transmits the safety marked data 52 through the two-way communication channel 110 to the second interface 220 in the second device 200.

A data handling application 270, then takes the safety marked data 52, extracts the original safety relevant data 50 from the safety marked data 52 by stripping the safety information 62 and forwards the extracted safety relevant data 50 to the second application 280. The data handling application 270 also retransmits the safety marked data 52 including the safety information back through the second interface 220 and the two way communication channel 110 to the first interface 120 as loop back data 56. In the example the data handling application 270 runs on the same core 260 as the second application 280 but in alternative embodiments the data handling application may run on a different core or be implemented in hardware.

The first interface 120 then passes the loop back data 56 to the safety guard 140. The safety unit 142 checks the loop back data 56 using the safety information 62 in the loop back data 56, and if the checking indicates an error, transmits an error notification signal to the first application 180 and the second application 280.

In the example of FIG. 1, a separate notification channel 190, separate from the two-way communication channel 110 is provided between the first device 100 and the second device 200 for transmitting the error notification signal from the safety guard 140 to the second device 200. This allows for communication in case there is an ongoing problem with communication along the two-way communication channel 110. In other examples, the error notification signal may be transmitted along the two-way communication channel 110.

Note that the data-handling application 270 and the second device 200 do not need to carry out complex calculations relating to the safety information and so the second device 200 may be a lower power or simpler device than the first device 100. Thus, the system may deliver improved safety using the first device 100 with the hardware safety guard 140 without the need for complex or expensive hardware in the second device 200.

The safety information will now be described in more detail.

In an example, the safety unit 142 creates a header including check data as the safety information and adds this header to the safety relevant data 50 to create the safety marked data 52. In other examples, the safety information is not added as header but elsewhere.

In particular, the safety unit 142 may calculate cyclic redundancy check, CRC; data as the safety information. The calculation of a CRC from data is known and will not be described further.

Figure 2:
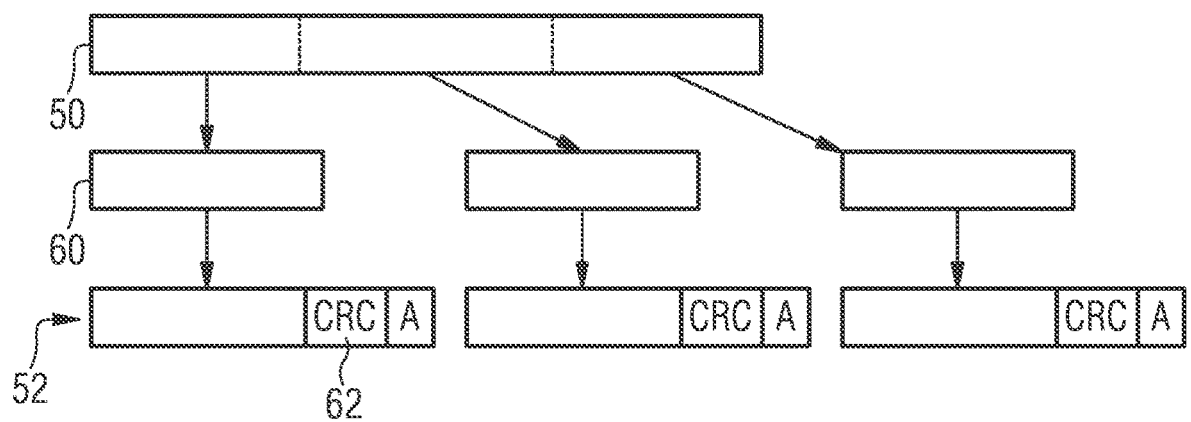
FIG. 2 is a schematic drawing of the frame structure of data used in the example of FIG. 1.

In a particular example, with reference to FIG. 2, the first device 100 is arranged to transmit the safety relevant data 50 by first splitting the safety relevant data 50 into a plurality of unprotected frames 60, each frame having a respective sequence number A.

The safety unit 142 then processes each unprotected frame 60 by calculating a CRC 62 corresponding to the unprotected frame 60, appending the CRC 62 and the sequence number A to the unprotected frame 60 to form a protected frame. Each protected frame is then passed in sequence to the first interface 120.

Alternatively, the sequence number A can first be added to the unprotected frame 60 and then the CRC 62 calculated based on both the unprotected frame 60 and the sequence number. In this way, also the sequence number is checked and controlled by the CRC 62.

Referring to FIG. 3, the same first device 100 may also operate with an alternative second device 300 which in this example is arranged to transmit data from the second application 280 running in second device 300 to the first application 180 running in the first device 100. In this example, the second device 300 is a device with sufficient processing capability in processor 260 or in additional processor capacity to calculate safety information with sufficient speed.

In this alternative operation mode safety relevant data 50 from the second application 280 is passed to the data-handling application 270 which unlike safety guard 140 is not a dedicated hardware unit but an application 280 running on processor 260. The data-handling application 270 adds safety information to the safety relevant data 50 to create safety marked data 52.

This data is then passed to second interface 220 which transmits the safety marked data 52 through the two-way communication channel 110 to the first interface 120. The safety relevant data 50 is passed to safety guard 140 which extracts the safety information from the received safety marked data 52. The safety information is checked and if the safety information indicates that the safety relevant data 50 has been safely received, the safety relevant data 50 is extracted from the safety marked data 52 and forwarded to the first application 180.

In contrast, if the safety information indicates that the safety relevant data 50 has not been safely received, the safety guard 140 transmits an error notification signal to the first application 180 and/or the second application 280 in a similar manner to the notification described above with reference to FIG. 1, except that in this case the error notification signal relates to data transfer from the second device 200 to the first device 100 instead of from the first device 100 to the second device 200.

Referring to FIG. 4, the same first device 100 may also operate with a further alternative second device 400 which in this example is arranged to transmit data from the second device 400 to the first device 100. In this example, unlike in the example described above with respect to FIG. 3, the second device 400 does not have sufficient processing power to rapidly calculate safety information.

In this case safety relevant data 50 is taken from the second application 280 and passed to the first application 180 in a second alternative operation mode by first transmitting the safety relevant data 50 through the second interface 220 and the two-way communication channel 110 to the first interface 120.

The safety relevant data 50 is then passed to the safety guard 140 which forwards the safety relevant data 50 to the first application. The safety guard 140 also retransmits the safety relevant data 50 by passing the safety relevant data 50 to the first interface 120 as a second loop back data 58.

The first interface 120 then transmits the second loop back data 58 through the two-way communications channel 110 to the second interface 220.

The data-handling application 270 then checks whether the second looped back data 58 differs from the safety relevant data 50 originally transmitted, and if the looped back data 58 differs, transmits an error notification signal to the first application 180 and/or the second application 280.

Thus, a hardware first device 100 is provided which may communicate in a variety of different ways with a variety of different second devices 200, 300, 400 depending on the need or application. The provision of the hardware safety guard 140 in the first device 100 with the functionality described above allows the second device 200, 300, 400 to be simpler than first device 100 and the second device 200, 300, 400 can be run with low-power consumption.

The invention has been described above with reference to examples, but those skilled in the art will realize that the details in the examples may be modified, combined together in different ways or adapted.

In particular, the first 100 and second devices 200, 300, 400 may be any form of device with sufficient computing power in hardware and/or software to carry out the method.

The various functions can be implemented in a variety of ways, for example using hard wired circuitry, logic circuitry, a processor executing firmware stored in the processor or in a separate memory, or a processor executing code stored or delivered from an external memory, or a device, or combinations thereof.

The devices may be implemented in any convenient semiconductor technology at any suitable scale.

The description of the method includes a number of operation modes. Those skilled in the art will realize that many additional operation modes are possible, and that devices may be provided that run in one, some or all of the above operation modes.

There may be provided a system comprising
- n. a first device, comprising:
  1. a first processor for running a first application;
  2. a first interface for transmitting and receiving data along a two-way communication channel; and
  3. a safety guard consisting of a hardware block between the processor and the interface;
- o. a second device comprising:
  1. a second processor for running a second application;
  2. a second interface connected to the second processor for transmitting and receiving data along the two-way communication channel with the first interface;
- p. wherein the system is arranged to send safety relevant data from the first application to the second application by:
- q. in the safety guard, adding safety information to the safety relevant data to create safety marked data;
- r. transmitting the safety marked data through the first interface and the two-way communication channel to the second interface;
- s. extracting the safety relevant data from the safety marked data and forwarding the extracted safety relevant data to the second application;
- t. retransmitting the safety marked data from the second interface back through the two-way communication channel to the first interface as loop back data;
- u. in the safety guard, checking the loop back data using the safety information in the loop back data, and if the checking indicates an error, transmitting an error notification signal to the first application and the second application.

Adding safety information may include adding a header to the data including check data.

The check data may be a header including a cyclic redundancy check, CRC.

The first device may be arranged to transmit the safety relevant data by splitting the safety relevant data into a plurality of unprotected frames each frame having a respective sequence number, and
- v. the safety guard may be arranged to process an unprotected frame by
- w. calculating a CRC corresponding to the unprotected frame;
- x. appending the CRC and the sequence number A to the unprotected frame to form a protected frame; and
- y. passing the protected frame to the first interface.

A separate notification channel may be provided between the first device and the second device for transmitting the error notification signal.

The first device may be arranged to transmit the error notification signal to the second device through the two-way communication channel.

The system may be arranged to send safety relevant data from the second application to the first application in a first alternative operation mode by:
- z. in the second device, adding safety information to the safety relevant data to create safety marked data;
- aa. transmitting the safety marked data through the second interface and the two-way communication channel to the first interface;
- bb. in the safety guard, extracting the safety information from the received safety marked data, checking the safety information; and
- cc. if the safety information indicates that the safety relevant data has been safely received, extracting the safety relevant data from the safety marked data and forwarding the extracted safety relevant data to the first application; or
- dd. if the safety information indicates that the safety relevant data has not been safely received, transmitting an error notification signal to the first application and/or the second application.

The system may further be arranged to send safety relevant data from the second application to the first application in a second alternative operation mode by:
- ee. transmitting the safety relevant data through the second interface and the two-way communication channel to the first interface;
- ff. in the safety guard, forwarding the safety relevant data to the first application and also looping back the safety relevant data to the first interface;
- gg. retransmitted the looped back safety relevant data through the two-way communications channel to the second interface; and
- hh. in the second device, checking whether the looped back data differs from the safety relevant data originally transmitted, and if the looped back data differs, transmitting an error notification signal to the first application and/or the second application.

A safety device may comprise:
- ii. a first processor for running a first application;
- jj. a first interface for transmitting and receiving data along a two-way communication channel to a second device having a second interface and having a second processor for running a second application, and
- kk. a safety guard consisting of a hardware block between the processor and the interface;
- ll. wherein the safety guard may be arranged to send safety relevant data from the first application to the second application by:
- mm. in the safety guard, adding safety information to the safety relevant data to create safety marked data;
- nn. transmitting the safety marked data through the first interface and the two-way communication channel to the second interface;
- oo. receiving in the first interface safety marked data as looped back data looped from the second device back through the two-way communication channel to the first interface as loop back data;
- pp. in the safety guard, checking the loop back data using the safety header in the loop back data, and if the checking indicates an error, transmitting an error notification signal to the first application and/or the second application.

The first device may be arranged to transmit the safety relevant data by splitting the safety relevant data into a plurality of unprotected frames each frame having a respective sequence number, and qq. the safety guard may be arranged to process an unprotected frame by:

rr. calculating a CRC corresponding to the unprotected frame;

ss. appending the CRC and the sequence number A to the unprotected frame to form a protected frame; and tt. passing the protected frame to the first interface.

A method of transmitting data between a first device and a second device along a two-way communications interface may have a first device with a first processor running a first application, a first interface for transmitting and receiving data and a safety guard between the first processor and the first interface, and a second device with a second processor running a second application, and a second interface for transmitting and receiving data. The method may include sending safety relevant data from the first application to the second application by:

uu. in the safety guard, adding safety information to the safety relevant data to create safety marked data;

vv. transmitting the safety marked data through the first interface and the two-way communication channel to the second interface;

ww. extracting the safety relevant data from the safety marked data and forwarding the extracted safety relevant data to the second application;

xx. retransmitting the safety marked data from the second interface back through the two-way communication channel to the first interface as loop back data;

yy. in the safety guard, checking the loop back data using the safety header in the loop back data, and if the checking indicates an error, transmitting an error notification signal to the first application and/or the second application.

Adding safety information to the safety relevant data may include adding a header to the safety relevant data including check data.

Adding safety relevant data may include:

zz. splitting the safety relevant data into a plurality of unprotected frames each frame having a respective sequence number;

aaa. calculating a CRC corresponding to the unprotected frame or corresponding to the unprotected frame together with the sequence number; and bbb. appending the CRC and the sequence number to the unprotected frame to form a protected frame.

The method may further include sending safety relevant data from the second application to the first application in a first alternative operation mode by:

ccc. in the second device, adding safety information to the safety relevant data to create safety marked data;

ddd. transmitting the safety marked data through the second interface and the two-way communication channel to the first interface;

eee. in the safety guard, extracting the safety information from the received safety marked data, checking the safety information; and fff. if the safety information indicates that the safety relevant data has been safely received, extracting the safety relevant data from the safety marked data and forwarding the extracted safety relevant data to the first application; or ggg. if the safety information indicates that the safety relevant data has not been safely received, transmitting an error notification signal to the first application and/or the second application.

The method may further include sending safety relevant data from the second application to the first application in a second alternative operation mode by:

hhh. transmitting the safety relevant data through the second interface and the two-way communication channel to the first interface;

iii. in the safety guard, forwarding the safety relevant data to the first application and also looping back the safety relevant data to the first interface;

jjj. retransmitted the looped back safety relevant data through the communications two-way channel to the second interface; and kkk. in the second device, checking whether the looped back data differs from the safety relevant data originally transmitted, and if the looped back data differs, transmitting an error notification signal to the first application and/or the second application.

What is claimed is:

1. A system comprising
a first device, comprising:
   a first processor for running a first application;
   a first interface for transmitting and receiving data along a two-way communication channel, and
   a safety guard consisting of a hardware block between the first processor and the first interface;
a second device comprising:
   a second processor for running a second application;
   a second interface connected to the second processor for transmitting and receiving data along the two-way communication channel with the first interface;
wherein the system is arranged to send safety relevant data from the first application to the second application by:
in the safety guard, adding safety information to the safety relevant data to create safety marked data;
transmitting the safety marked data through the first interface and the two-way communication channel to the second interface;
extracting the safety relevant data from the safety marked data and forwarding the extracted safety relevant data to the second application;
retransmitting the safety marked data from the second interface back through the two-way communication channel to the first interface as loop back data, where the loop back data is the same as the safety marked data and includes the safety information;
in the safety guard, checking the loop back data using the safety information in the loop back data, and when the checking indicates an error, transmitting an error notification signal to the first application and/or the second application.

2. The system according to claim 1, wherein adding the safety information includes adding a header to the safety relevant data including check data.

3. The system according to claim 2 wherein the check data is a header including a cyclic redundancy check.

4. The system according to claim 1, wherein
the first device is arranged to transmit the safety relevant data by splitting the safety relevant data into a plurality of unprotected frames, each unprotected frame having a respective sequence number, and
the safety guard is arranged to process an unprotected frame by:
calculating a cyclic redundancy check (CRC) corresponding to the unprotected frame;
appending the CRC and the sequence number to the unprotected frame to form a protected frame; and
passing the protected frame to the first interface.

5. The system according to claim 1, further comprising a notification channel between the first device and the second device for transmitting the error notification signal, the notification channel being separate from the two-way communication channel.

6. The system according to claim 1, wherein the first device is arranged to transmit the error notification signal to the second device through the two-way communication channel.

7. The system according to claim 1, wherein the system is arranged to send additional safety relevant data from the second application to the first application in a first alternative operation mode by:
- in the second device, adding additional safety information to the additional safety relevant data to create additional safety marked data;
- transmitting the additional safety marked data through the second interface and the two-way communication channel to the first interface;
- in the safety guard, extracting the additional safety information from the received additional safety marked data, and checking the additional safety information; and
- when the additional safety information indicates that the additional safety relevant data has been safely received, extracting the additional safety relevant data from the additional safety marked data and forwarding the extracted additional safety relevant data to the first application; or
- when the additional safety information indicates that the additional safety relevant data has not been safely received, transmitting an additional error notification signal to the first application and/or the second application.

8. The system according to claim 1, wherein the system is arranged to send additional safety relevant data from the second application to the first application in a second alternative operation mode by:
- transmitting the additional safety relevant data through the second interface and the two-way communication channel to the first interface;
- in the safety guard, forwarding the additional safety relevant data to the first application and also looping back the additional safety relevant data to the first interface;
- retransmitting the looped back additional safety relevant data through the two-way communications channel to the second interface; and
- in the second device, checking whether the looped back additional safety relevant data differs from the additional safety relevant data originally transmitted, and when the looped back additional safety relevant data differs, transmitting an additional error notification signal to the first application and/or the second application.

9. A safety device comprising
a first device comprising a first processor for running a first application;
a first interface for transmitting and receiving data along a two-way communication channel to a second device having a second interface and having a second processor for running a second application, and
a safety guard consisting of a hardware block between the first processor and the first interface;
wherein the safety guard is arranged to send safety relevant data from the first application to the second application by:
- in the safety guard, adding safety information to the safety relevant data to create safety marked data;
- transmitting the safety marked data through the first interface and the two-way communication channel to the second interface;
- receiving in the first interface the safety marked data as looped back data looped from the second device back through the two-way communication channel to the first interface as loop back data, where the loop back data is the same as the safety marked data and includes the safety information;
- in the safety guard, checking the loop back data using the safety information in the loop back data, and when the checking indicates an error, transmitting an error notification signal to the first application and/or the second application.

10. The safety device according to claim 9, wherein
the first device is arranged to transmit the safety relevant data by splitting the safety relevant data into a plurality of unprotected frames, each unprotected frame having a respective sequence number; and
the safety guard is arranged to process an unprotected frame by:
- calculating a cyclic redundancy check (CRC) corresponding to the unprotected frame;
- appending the CRC and the sequence number to the unprotected frame to form a protected frame; and
- passing the protected frame to the first interface.

11. A method of transmitting data between a first device and a second device along a two-way communications channel, wherein the first device has a first processor running a first application, a first interface for transmitting and receiving data and a safety guard between the first processor and the first interface, and the second device has a second processor running a second application, and a second interface for transmitting and receiving data, the method comprising sending safety relevant data from the first application to the second application by:
- in the safety guard, adding safety information to the safety relevant data to create safety marked data;
- transmitting the safety marked data through the first interface and the two-way communication channel to the second interface;
- extracting the safety relevant data from the safety marked data and forwarding the extracted safety relevant data to the second application;
- retransmitting the safety marked data from the second interface back through the two-way communication channel to the first interface as loop back data, where the loop back data is the same as the safety marked data and includes the safety information;
- in the safety guard, checking the loop back data using the safety information in the loop back data, and when the checking indicates an error, transmitting an error notification signal to the first application and/or the second application.

12. The method according to claim 11, wherein adding the safety information to the safety relevant data includes adding a header to the safety relevant data including check data.

13. The method according to claim 11, wherein adding the safety relevant data comprises:
- splitting the safety relevant data into a plurality of unprotected frames, each unprotected frame having a respective sequence number;

calculating a cyclic redundancy check (CRC) corresponding to the unprotected frame or corresponding to the unprotected frame together with the sequence number; and appending the CRC and the sequence number to the unprotected frame to form a protected frame.

14. The method according to claim 11, further comprising sending additional safety relevant data from the second application to the first application in a first alternative operation mode by:

in the second device, adding additional safety information to the additional safety relevant data to create additional safety marked data;

transmitting the additional safety marked data through the second interface and the two-way communication channel to the first interface;

in the safety guard, extracting the additional safety information from the received additional safety marked data, and checking the additional safety information; and when the additional safety information indicates that the additional safety relevant data has been safely received, extracting the additional safety relevant data from the additional safety marked data and forwarding the extracted additional safety relevant data to the first application; or when the additional safety information indicates that the additional safety relevant data has not been safely received, transmitting an additional error notification signal to the first application and/or the second application.

15. The method according to claim 11, further comprising sending additional safety relevant data from the second application to the first application in a second alternative operation mode by:

transmitting the additional safety relevant data through the second interface and the two-way communication channel to the first interface;

in the safety guard, forwarding the additional safety relevant data to the first application and also looping back the additional safety relevant data to the first interface;

retransmitting the looped back additional safety relevant data through the two-way communications channel to the second interface; and in the second device, checking whether the looped back data differs from the additional safety relevant data originally transmitted, and when the looped back data differs, transmitting an error notification signal to the first application and/or the second application.

* * * * *